United States Patent
Kim et al.

(10) Patent No.: US 12,271,808 B2
(45) Date of Patent: Apr. 8, 2025

(54) METHOD AND APPARATUS WITH NEURAL NETWORK OPERATION

(71) Applicant: SAMSUNG ELECTRONICS CO., LTD., Suwon-si (KR)

(72) Inventors: Myeong Woo Kim, Suwon-si (KR); Hanwoong Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1003 days.

(21) Appl. No.: 17/191,292

(22) Filed: Mar. 3, 2021

(65) Prior Publication Data
US 2022/0114426 A1    Apr. 14, 2022

(30) Foreign Application Priority Data
Oct. 8, 2020 (KR) .................. 10-2020-0130312

(51) Int. Cl.
| | |
|---|---|
| *G06N 3/063* | (2023.01) |
| *G06F 7/50* | (2006.01) |
| *G06F 7/523* | (2006.01) |
| *G06F 7/544* | (2006.01) |

(52) U.S. Cl.
CPC .............. *G06N 3/063* (2013.01); *G06F 7/50* (2013.01); *G06F 7/523* (2013.01); *G06F 7/5443* (2013.01)

(58) Field of Classification Search
CPC .......... G06N 3/04; G06N 3/042; G06N 3/043; G06N 3/044; G06N 3/0442; G06N 3/045; G06N 3/0455; G06N 3/0464; G06N 3/0475; G06N 3/0495; G06N 3/0499; G06N 3/063; G06F 7/50; G06F 7/523; G06F 7/5443
See application file for complete search history.

(56) References Cited

U.S. PATENT DOCUMENTS

| | | | |
|---|---|---|---|
| 6,081,225 A * | 6/2000 | Tsai | G01S 7/4021 |
| | | | 342/91 |
| 9,467,261 B2 | 10/2016 | Papasakellariou et al. | |
| 9,928,035 B2 | 3/2018 | Kossel | |
| 10,162,632 B1 | 12/2018 | Farooqui et al. | |
| 10,621,489 B2 | 4/2020 | Appuswamy et al. | |
| 11,176,449 B1 * | 11/2021 | Nez | G06F 12/0207 |

(Continued)

FOREIGN PATENT DOCUMENTS

| | | |
|---|---|---|
| CN | 109948787 A | 6/2019 |
| CN | 110135554 A | 8/2019 |

(Continued)

OTHER PUBLICATIONS

Bai, Lin, Yiming Zhao, and Xinming Huang. "A CNN accelerator on FPGA using depthwise separable convolution." *IEEE Transactions on Circuits and Systems II: Express Briefs* 65.10 (2018): 1415-1419.

(Continued)

*Primary Examiner* — Emily E Larocque
(74) *Attorney, Agent, or Firm* — NSIP Law (57) ABSTRACT

A neural network operation apparatus includes: a receiver configured to receive a first input feature map; a controller configured to control multiplier-accumulators (MACs) included in a first MAC array; and a first operation engine comprising the first MAC array and configured to process the first input feature map based on the MACs of which operation states are controlled.

22 Claims, 6 Drawing Sheets

(56) References Cited

U.S. PATENT DOCUMENTS

| | | |
|---|---|---|
| 2019/0095795 A1 | 3/2019 | Ren et al. |
| 2019/0197083 A1* | 6/2019 | Chen ..................... G06F 17/153 |
| 2020/0026978 A1 | 1/2020 | Ovsiannikov et al. |
| 2020/0073636 A1 | 3/2020 | Cammarota et al. |
| 2020/0090030 A1 | 3/2020 | Huang et al. |
| 2021/0089889 A1* | 3/2021 | Gope ...................... G06N 3/04 |

FOREIGN PATENT DOCUMENTS

| | | | |
|---|---|---|---|
| EP | 3674982 A1 * | 7/2020 | |
| KR | 10-2019-0099931 A | 8/2019 | |

OTHER PUBLICATIONS

Korean Office Action issued on Dec. 23, 2024 in corresponding Korean Patent Application No., 10-2020-0130312. (2 pages in English and 5 pages in Korean).

* cited by examiner

METHOD AND APPARATUS WITH NEURAL NETWORK OPERATION

CROSS-REFERENCE TO RELATED APPLICATIONS

This application claims the benefit under 35 USC § 119(a) of Korean Patent Application No. 10-2020-0130312 filed on Oct. 8, 2020, in the Korean Intellectual Property Office, the entire disclosure of which is incorporated herein by reference for all purposes.

BACKGROUND

1. Field

The following description relates to a method and apparatus with a neural network operation.

2. Description of Related Art

An elementwise sum operation may refer to an operation of summing values at the same position in two feature maps having the same size. This elementwise sum operation may be performed by being replaced with a convolution operation.

The elementwise sum operation may be performed by concatenating two feature maps in a channel direction and then performing a convolution operation with a weight of "1" on positions mapped to features at feature map positions to be added up.

However, a large weight size may be required to perform the elementwise sum operation in this way, thereby worsening operational performance and/or increasing memory consumption.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a neural network operation apparatus includes: a receiver configured to receive a first input feature map; a controller configured to control multiplier-accumulators (MACs) included in a first MAC array; and a first operation engine comprising the first MAC array and configured to process the first input feature map based on the MACs of which operation states are controlled.

For the controlling, the controller may be configured to: set an operation state of one MAC in the first MAC array to an enable state, and set an operation state of remaining MACs except for the one MAC in the first MAC array to a disable state, and for the processing, the first operation engine may be configured to perform a depthwise convolution operation on the first input feature map.

For the receiving, the receiver may be configured to receive a second input feature map.

The apparatus may include: a second operation engine comprising a second MAC array and configured to process a second input feature map based on the second MAC array.

For the controlling, the controller may be configured to control the first operation engine and the second operation engine, and the first operation engine and the second operation engine may be configured to perform an elementwise sum operation of the first input feature map and the second input feature map based on the controlling.

For the controlling, the controller may be configured to: set an operation state of one MAC in the first MAC array to an enable state and set an operation state of remaining MACs in the first MAC array to a disable state; and set an operation state of one MAC in the second MAC array to an enable state and set an operation state of remaining MACs in the second MAC array to a disable state, and the first operation engine and the second operation engine may be configured to perform an elementwise sum operation of the first input feature map and the second input feature map, based on the MACs included in the first MAC array and the MACs included in the second MAC array of which operation states are controlled.

The apparatus may include: a weight buffer having a height of "1", a width of "1", and a predetermined length.

A value of a weight of the weight buffer may be "1".

The MACs included in the first MAC array may be concatenated in an adder tree structure.

In another general aspect, a neural network operation method includes: receiving a first input feature map; controlling operation states of multiplier-accumulators (MACs) included in a first MAC array; and processing the first input feature map based on the MACs of which operation states are controlled.

The controlling may include: setting an operation state of one MAC in the first MAC array to an enable state; and setting an operation state of remaining MACs except for the one MAC in the first MAC array to a disable state, and the processing may include performing a depthwise convolution operation on the first input feature map.

The receiving may include receiving a second input feature map.

The controlling may include controlling operation states of MACs included in a second MAC array, and the processing may include processing the second input feature map based on the MACs included in the second MAC array of which operation states are controlled.

The processing may include performing an elementwise sum operation of the first input feature map and the second input feature map, based on the MACs included in the first MAC array and the MACs included in the second MAC array of which operation states are controlled.

The controlling of the MACs included in the first MAC array and the second MAC array may include: setting an operation state of one MAC in the first MAC array to an enable state; setting an operation state of remaining MACs except for the one MAC in the first MAC array to a disable state; setting an operation state of one MAC in the second MAC array to an enable state; and setting an operation state of remaining MACs except for the one MAC in the second MAC array to a disable state.

A weight used for the processing of the first input feature map may have a height of "1", a width of "1", and a predetermined length.

A value of the weight may be "1".

The MACs included in the first MAC array may be concatenated in an adder tree structure.

A non-transitory computer-readable storage medium may store instructions that, when executed by a processor, configure the processor to perform the method.

In another general aspect, a neural network operation apparatus includes: a first multiplier-accumulator (MAC) array configured to perform a depthwise convolution operation on a first input feature map; a second MAC array configured to perform the depthwise convolution operation on a second input feature map; and a controller configured to, in each of the first MAC array and the second MAC array, set an operation state of one MAC to an enable state and set an operation state of remaining MACs except for the one MAC to a disable state, wherein, based on the set operational states, the first MAC array and the second MAC array may be configured to perform an elementwise sum operation of the first input feature map and the second input feature map by respectively performing the depthwise convolution operation.

The depthwise convolution operation may be performed based on weights, and a total number of the weights may be equal to a total number of input channels of either of the first input feature map and the second input feature map.

The first input feature map and the second input feature map may correspond to images, and the first operation engine and the second operation engine may be configured to generate an output feature map by the performing of the elementwise sum operation.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Hereinafter, examples will be described in detail with reference to the accompanying drawings. However, various alterations and modifications may be made to the examples. Here, the examples are not construed as limited to the disclosure. The examples should be understood to include all changes, equivalents, and replacements within the idea and the technical scope of the disclosure.

The terminology used herein is for the purpose of describing particular examples only and is not to be limiting of the present disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms including technical and scientific terms used herein have the same meaning as commonly understood by one of ordinary skill in the art to which this disclosure pertains consistent with and after an understanding of the present disclosure. It will be further understood that terms, such as those defined in commonly-used dictionaries, should be interpreted as having a meaning that is consistent with their meaning in the context of the relevant art and the present disclosure, and will not be interpreted in an idealized or overly formal sense unless expressly so defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The same name may be used to describe an element included in the examples described above and an element having a common function. Unless otherwise mentioned, the descriptions on the examples may be applicable to the following examples and thus, duplicated descriptions will be omitted for conciseness.

Figure 1:
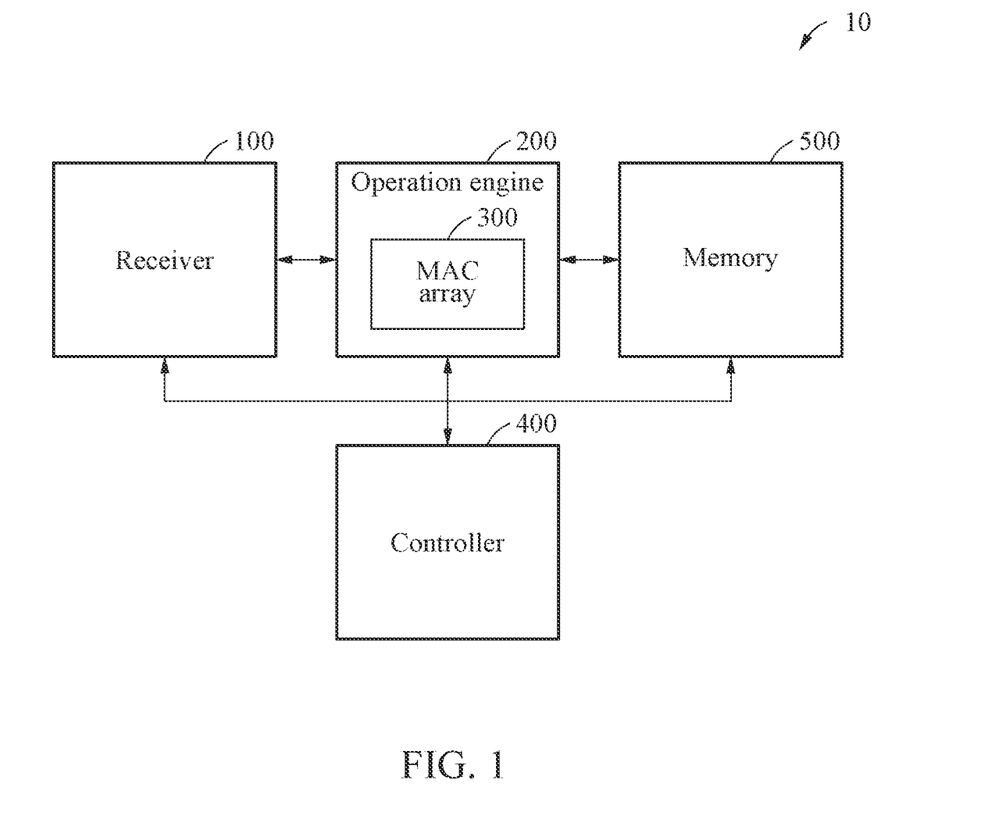
FIG. 1 illustrates an example of a neural network operation apparatus.
Figure 2:
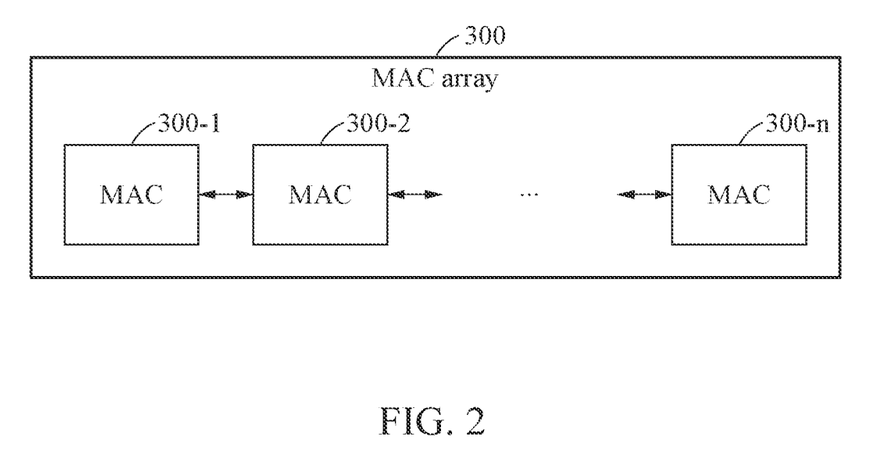
FIG. 2 illustrates an example of a multiplier-accumulator (MAC) array.

FIG. 1 illustrates an example of a neural network operation apparatus, and FIG. 2 illustrates an example of a multiplier-accumulator (MAC) array (for example, a multiplier-accumulator (MAC) array shown in FIG. 1).

Referring to FIG. 1, a neural network operation apparatus 10 may perform an operation accompanying, or of, a neural network. The neural network may implement machine learning. The neural network may refer to a model that has an ability to solve a problem, where nodes forming the network through synaptic combinations change a connection strength of synapses through training.

The neural network may include a deep neural network (DNN). The neural network may include a convolutional neural network (CNN), a recurrent neural network (RNN), a perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN).

The neural network operation apparatus 10 may receive input data and perform an operation on the input data. The neural network operation apparatus 10 may perform various operations using the characteristics of a hardware structure of multiplier-accumulator (MAC) operators (or MACs) which are based on an adder tree structure.

For example, the neural network operation apparatus 10 may perform a depthwise convolution operation and an elementwise sum operation by controlling an operation engine including a MAC operator.

The neural network operation apparatus 10 may control an operation engine including a MAC array, thereby improving operational performance and reducing memory consumption.

The neural network operation apparatus 10 may perform an elementwise sum operation using an operation element that performs a convolution operation. In this example, the elementwise sum operation may be performed by concatenating input feature maps in a channel direction and performing a convolution operation with a weight set to "1" for positions mapped to features at feature map positions to be added up.

However, when the elementwise sum operation is performed through the typical concatenation and the convolution operation, overhead is generated due to an unnecessary weight. Thus, in order to reduce such overhead, a process of performing an operation iteratively by dividing the weight to a required size may be demanded.

The neural network operation apparatus 10 of one or more embodiments may control operation engines to perform the elementwise sum operation using a convolution operation element, thereby reducing memory consumption.

The neural network operation apparatus 10 may include a receiver 100, an operation engine 200, and a controller 400. The neural network operation apparatus 10 may further include a memory 500.

The operation engine 200 may include a MAC array 300. The MAC array 300 may include MACs 300-1, 300-2, . . . 300-$n$.

The receiver 100 may receive input data. The input data may include images or feature maps. A feature map may be data that is processed in the form of a matrix obtained by performing a filter (or kernel) and other operations on an image, by the neural network operation apparatus 10, for example.

For example, the receiver 100 may receive a first input feature map and/or a second input feature map.

The controller 400 may control operation states of the MACs 300-1, 300-2, . . . 300-$n$ included in the MAC array 300. The operation states of the MACs 300-1, 300-2, . . . 300-$n$ may include enable states and disable states.

An enable state may refer to a state of a MAC being turned on to perform an operation, and a disable state may refer to a state of a MAC being turned off not to perform an operation.

The MAC array 300 may process an input feature map. The controller 400 may control the operation engine 200 and/or the MAC array 300. In detail, the controller 400 may set an operation state of the MAC array 300 to an enable state or a disable state.

The MACs 300-1, 300-2, . . . 300-$n$ included in the MAC array 300 may be concatenated in an adder tree structure.

The controller 400 may set an operation state of one MAC in the MAC array 300 to an enable state. The controller 400 may set operation states of remaining MACs except for the one MAC set to the enable state in the MAC array 300 to disable states, to perform a depthwise convolution operation on the input feature map.

The operation engine 200 may process the input feature map based on the MACs 300-1, 300-2, . . . 300-$n$ of which operation states are controlled.

The operation engine 200 may perform a convolution operation of components of an input feature map and weights. The memory 500 may include a weight buffer. The weight buffer may store the values of weights.

The controller 400 may change the values of weights stored in the weight buffer according to the type of operation to be performed. For example, the controller 400 may store weight or filter parameters in the weight buffer when a convolution operation is to be performed, and store weights of "1" in the weight buffer when an elementwise sum operation is to be performed.

The controller 400 may be, or may be implemented using, a processor (for example, one or more processors). The processor may process data stored in the memory 500. The processor may be configured to perform operations when instructions stored in the memory 500 are executed.

The processor may be a hardware-implemented data processing device including a circuit having a physical structure to perform desired operations. For example, the desired operations may include instructions or codes included in a program.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA).

The memory 500 may store instructions (or programs) executable by the processor. For example, the instructions may include instructions to perform an operation of the processor and/or an operation of each element of the processor.

The memory 500 may be implemented as a volatile memory device or a non-volatile memory device.

The volatile memory device may be implemented as a dynamic random access memory (DRAM), a static random access memory (SRAM), a thyristor RAM (T-RAM), a zero capacitor RAM (Z-RAM), or a Twin Transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory.

Figure 3:
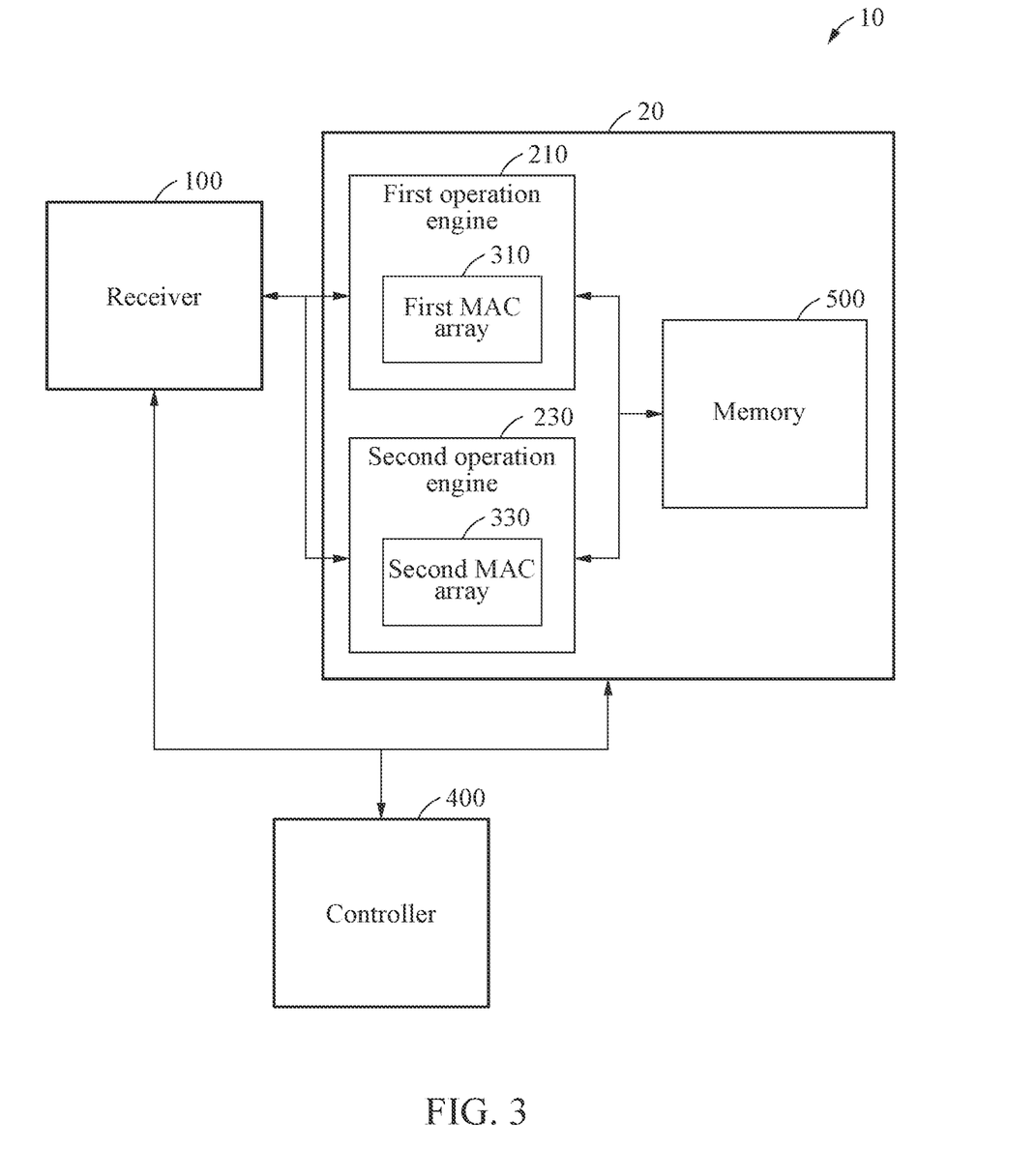
FIG. 3 illustrates an example of a neural network operation apparatus.

FIG. 3 illustrates an example of a neural network operation apparatus.

Referring to FIG. 3, the neural network operation apparatus 10 may include the receiver 100, an operator 20, and the controller 400. The operator 20 may include a first operation engine 210, a second operation engine 230, and the memory 500.

The first operation engine 210 may include a first MAC array 310, and the second operation engine 230 may include a second MAC array 330. In this example, MACs included in the first MAC array 310 and the second MAC array 330 may be respectively concatenated in an adder tree structure as described in FIG. 2.

The receiver 100 may receive a first input feature map and/or a second input feature map. The receiver 100 may output the received first input feature map to the first operation engine 210 and output the received second input feature map to the second operation engine 230.

The first operation engine 210 and the second operation engine 230 may be positioned physically adjacent to each other.

For example, the first operation engine 210 and the second operation engine 230 may be implemented on a single element.

The first operation engine 210 may process the first input feature map. The second operation engine 230 may process the second input feature map.

The controller 400 may control the first operation engine 210 and the second operation engine 230 to perform an elementwise sum operation of the first input feature map and the second input feature map.

The controller 400 may set an operation state of one MAC in the first MAC array 310 to an enable state, and set operation states of remaining MACs except for the one MAC set to the enable state in the first MAC array 310 to disable states.

The controller 400 may set an operation state of one MAC in the second MAC array 330 to an enable state, and set operation states of remaining MACs except for the one MAC set to the enable state in the second MAC array 330 to disable states, to perform the elementwise sum operation of the first input feature map and the second input feature map.

The memory 500 may include a weight buffer. The weight buffer may have a predetermined height and a predetermined width.

The weight buffer may have a height and a width that vary (or are set by the controller 400) depending on the type of operation. In other words, the usage of the memory 500 may vary depending on the type of operation.

For example, the weight buffer may have a height of "1" and a width of "1" when an elementwise sum operation is to be performed. The weight buffer may have a predetermined length. The predetermined length may be determined based on the structure of a neural processing unit (NPU). For example, the predetermined length may be "64".

When a channel of a size greater than or equal to the predetermined length is input, the controller 400 may fix the length of the weight buffer to the predetermined length. For example, when the predetermined length is "64" and an input feature map greater than the predetermined length is input, the controller 400 may fix the size (for example, the length) of the weight buffer to "64".

In this example, the value of a weight of the weight buffer may be "1".

Figure 4:
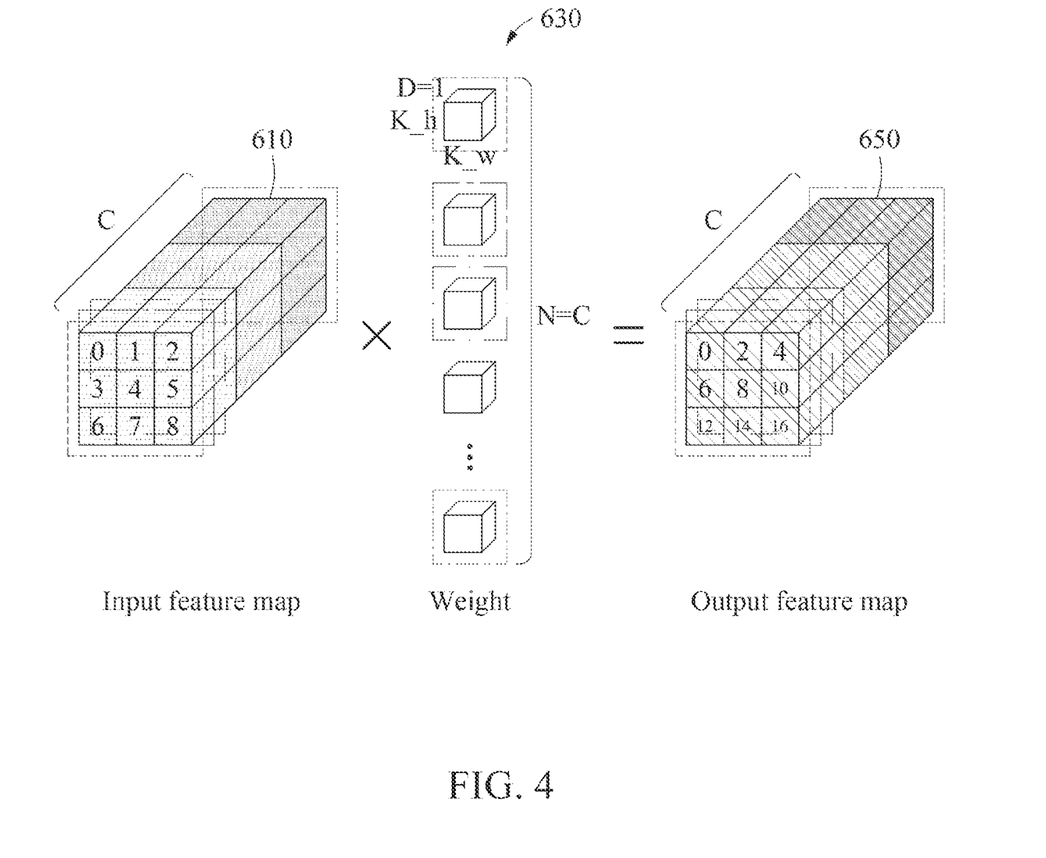
FIG. 4 illustrates an example of an operation performed by a neural network operation apparatus.

FIG. 4 illustrates an example of an operation performed by a neural network operation apparatus (for example, the neural network operation apparatus of FIG. 1 or 3).

Referring to FIG. 4, the receiver 100 may receive an input feature map 610. The receiver 100 may output the input feature map 610 to the operation engine 200. The operation engine 200 may process the input feature map 610 using the MAC array 300.

The operation engine 200 may perform a depthwise convolution operation on the input feature map 610. The depthwise convolution operation may refer to a convolution operation of performing a convolution operation only within a single channel (for example, performing each convolution operation with a respective channel). Spatial features of each channel of a feature map may be extracted through the depthwise convolution operation.

In the example of FIG. 4, the operation engine 200 may perform the depthwise convolution operation on the input feature map 610. In other words, the operation engine 200 may perform, for each input channel, a convolution operation between the input channel of the input feature map 610 including C input channels having a size of (3, 3) and a corresponding one of N filters 630 having a size of $(k_h, k_w)$ (where each filter has a height H and a depth D of "1", for example). Here, $k_h$ and $k_w$ may each have a value greater than or equal to "1". While the input channels of the input feature map 610 of FIG. 4 have a size of (3, 3), the size of the input channels may be any other size or dimension, according to non-limiting examples.

The depthwise convolution operation may refer to the process of generating an output feature map 650 including output values corresponding to the respective input channels and including C output channels having a size of (3, 3). In this example, the size of the output feature map may vary depending on the size of the filters and the stride of the convolution operation.

For example, a first channel of the output feature map 650 may be calculated by performing a convolution operation between a first channel of the input feature map 610 and a filter (or weight) 630 (for example, a first filter of the filters 630).

Similarly, the operation engine 200 may perform convolution operations for the remaining channels to generate the output feature map 650.

Figure 5:
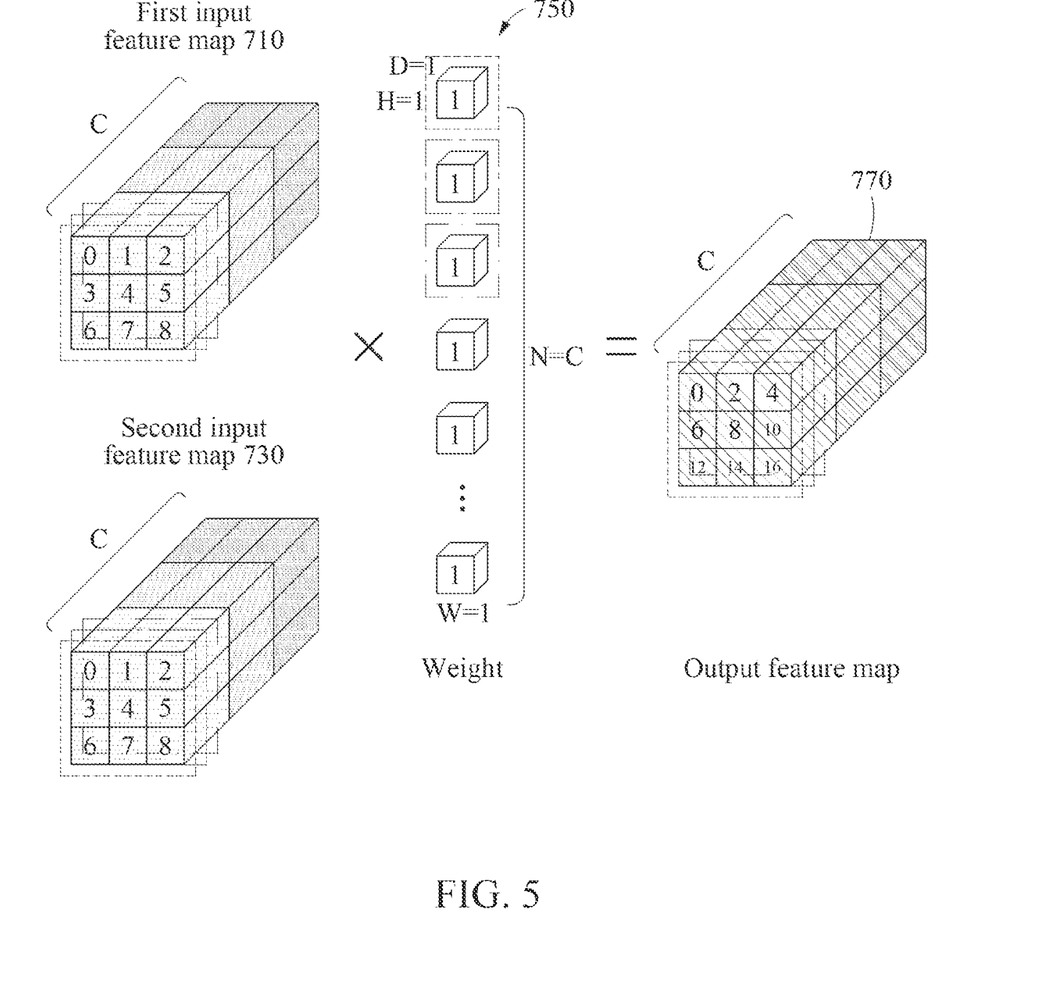
FIG. 5 illustrates an example of an operation performed by a neural network operation apparatus.

FIG. 5 illustrates an example of an operation performed by a neural network operation apparatus (for example, the neural network operation apparatus of FIGS. 1 and 3).

Referring to FIG. 5, the receiver 100 may receive a first input feature map 710 and a second input feature map 730. The receiver 100 may output the first input feature map 710 to the first operation engine 210 and output the second input feature map 730 to the second operation engine 230.

The MACs of the first operation engine 210 and the second operation engine 230 may be respectively concatenated in an adder tree structure. The MACs concatenated in the adder tree structure may refer to a structure in which MACs are arranged in the form of an array and operation results of the respective MACs are input into and added up by an adder tree.

The MACs concatenated in the adder tree structure may perform an operation of multiplying channel components of the input feature maps 710 and 730 input to the first operation engine 210 and the second operation engine 230 by weights of filters 750 and adding up the multiplying results, to generate an output feature map 770.

The controller 400 may perform a depthwise convolution operation or an elementwise sum operation by controlling operation states of the MACs included in the first MAC array 310 and the second MAC array 330 and concatenated in the adder tree structure.

For example, the controller 400 may perform a channel-wise operation by setting only one of the MACs included in the first MAC array 310 or the second MAC array 330 to an enable state, thereby achieving the same effect as an elementwise sum operation.

The controller 400 may set an operation state of one MAC in the first MAC array 310 to an enable state, and set operation states of remaining MACs except for the one MAC set to the enable state in the first MAC array 310 to disable states.

In this example, only one MAC in the first MAC array 310 may operate in an enable state to perform multiplication and addition operations on the first input feature map 710.

The controller 400 may set an operation state of one MAC in the second MAC array 330 to an enable state, and set operation states of remaining MACs except for the one MAC set to the enable state in the second MAC array 330 to disable states, to perform the elementwise sum operation of the first input feature map and the second input feature map.

In this example, only one MAC in the second MAC array 330 may operate in an enable state to perform multiplication and addition operations on the second input feature map 730.

Here, the value of a weight of a weight buffer having a height of "1", a width of "1", and a predetermined length may be set to "1" to perform the elementwise sum operation of the first input feature map 710 and the second input feature map 730.

Since the weight is "1", the components of the first input feature map 710 and the second input feature map 730 may be input into an adder without being changed even after the multiplication operation, such that the elementwise sum operation may be substantially performed.

As described above, by performing the elementwise sum operation using the hardware structure for a convolution operation, the neural network operation apparatus 10 of one or more embodiments may achieve a greater gain as the channel size increases.

The neural network operation apparatus 10 of one or more embodiments may use a characteristic of hardware called a depthwise convolution mode and thus, may reduce the weight and partial sum memory required to perform the elementwise sum operation when compared to a typical neural network operation apparatus performing a convolution by concatenating the input feature maps 710 and 730.

Further, the neural network operation apparatus 10 of one or more embodiments may reduce the computational cost for memory address allocation used by the typical neural network operation apparatus to concatenate the input feature maps 710 and 730, and operate with only one MAC (of respective MAC array, for example) enabled for the operation, thereby reducing the power consumption.

Figure 6:
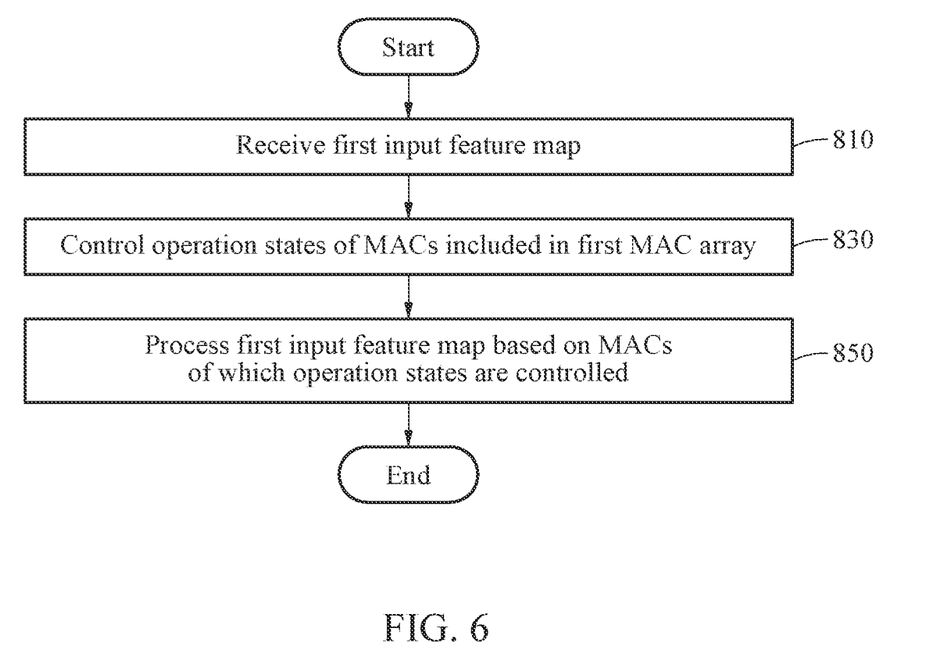
FIG. 6 illustrates an example of a flow of the operation of a neural network operation apparatus.

FIG. 6 illustrates an example of a flow of the operation of a neural network operation apparatus (for example, the neural network operation apparatus of FIGS. 1 and 3).

Referring to FIG. 6, in operation 810, the receiver 100 may receive the first input feature map 710. The receiver 100 may receive the second input feature map 730.

In operation 830, the controller 400 may control operation states of MACs included in the first MAC array 310. The controller 400 may process the second input feature map 730 by controlling operation states of MACs included in the second MAC array 330.

The controller 400 may set an operation state of one MAC in the first MAC array 310 to an enable state. The controller 400 may set operation states of remaining MACs except for the one MAC set to the enable state in the first MAC array 310 to disable states, to perform a depthwise convolution operation on the first input feature map 710.

In addition, the controller 400 may control the MACs included in the first MAC array 310 and the second MAC array 330 to perform an elementwise sum operation of the first input feature map 710 and the second input feature map 730.

The controller 400 may set an operation state of one MAC in the first MAC array 310 to an enable state, and set operation states of remaining MACs except for the one MAC set to the enable state in the first MAC array 310 to disable states.

The controller 400 may set an operation state of one MAC in the second MAC array 330 to an enable state, and set operation states of remaining MACs except for the one MAC in the second MAC array 330 to disable states.

A weight for processing the first input feature map may have a height of "1", a width of "1", and a predetermined length. For example, the value of the weight may be "1".

The MACs included in the first MAC array 310 or the second MAC array 330 may be concatenated in an adder tree structure.

The neural network operation apparatuses, receivers, operation engines, first operation engines, second operation engines, MAC arrays, first MAC arrays, second MAC arrays, MACs, controllers, memories, neural network operation apparatus 10, receiver 100, operation engine 200, first operation engine 210, second operation engine 230, MAC array 300, first MAC array 310, second MAC array 330, MACs 300-1, 300-2, . . . 300-n, controller 400, memory 500, and other apparatuses, devices, units, modules, and components described herein with respect to FIGS. 1-6 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A neural network operation apparatus, comprising:
a receiver configured to receive a first input feature map;
a controller configured to control multiplier-accumulators (MACs) included in a first MAC array by setting an operation state of one MAC in the first MAC array to an enable state and setting an operation state of remaining MACs in the first MAC array to a disable state; and a first operation engine comprising the first MAC array and configured to process the first input feature map based on the MACs of which operation states are controlled.

2. The apparatus of claim 1, wherein
for the processing, the first operation engine is configured to perform a depthwise convolution operation on the first input feature map.

3. The apparatus of claim 2, wherein, for the receiving, the receiver is configured to receive a second input feature map.

4. The apparatus of claim 1, further comprising:
a second operation engine comprising a second MAC array and configured to process a second input feature map based on the second MAC array.

5. The apparatus of claim 4, wherein
for the controlling, the controller is configured to control the first operation engine and the second operation engine, and
the first operation engine and the second operation engine are configured to perform an elementwise sum operation of the first input feature map and the second input feature map by the first operation engine performing a multiplication and addition operation on the first input feature map and the second operation engine performing a multiplication and addition operation on the second input feature map, based on the controlling.

6. The apparatus of claim 5, wherein
for the controlling, the controller is configured to:
set an operation state of one MAC in the first MAC array to an enable state and set an operation state of remaining MACs in the first MAC array to a disable state; and
set an operation state of one MAC in the second MAC array to an enable state and set an operation state of remaining MACs in the second MAC array to a disable state, and
the first operation engine and the second operation engine are configured to perform an elementwise sum operation of the first input feature map and the second input feature map, based on the MACs included in the first MAC array and the MACs included in the second MAC array of which operation states are controlled.

7. The apparatus of claim 1, further comprising:
a memory including a weight buffer having a height of "1", a width of "1", and a predetermined length.

8. The apparatus of claim 7, wherein a value of a weight of the weight buffer is "1".

9. The apparatus of claim 1, wherein operation results of the MACs included in the first MAC array are concatenated in an adder tree operation.

10. A neural network operation method, comprising:
receiving a first input feature map;
controlling operation states of multiplier-accumulators (MACs) included in a first MAC array by setting an operation state of one MAC in the first MAC array to an enable state and setting an operation state of remaining MACs in the first MAC array to a disable state; and
processing the first input feature map based on the MACs of which operation states are controlled.

11. The method of claim 10, wherein
the processing comprises performing a depthwise convolution operation on the first input feature map.

12. The method of claim 10, wherein the receiving comprises receiving a second input feature map.

13. The method of claim 10, wherein
the controlling comprises controlling operation states of MACs included in a second MAC array, and
the processing comprises processing the second input feature map based on the MACs included in the second MAC array of which operation states are controlled.

14. The method of claim 13, wherein the processing comprises performing an elementwise sum operation of the first input feature map and the second input feature map by the first MAC array performing a multiplication and addition operation on the first input feature map and the second MAC array performing a multiplication and addition operation on the second input feature map, based on the MACs included in the first MAC array and the MACs included in the second MAC array of which operation states are controlled.

15. The method of claim 14, wherein the controlling of the MACs included in the first MAC array and the second MAC array comprises:
setting an operation state of one MAC in the first MAC array to an enable state;
setting an operation state of remaining MACs except for the one MAC in the first MAC array to a disable state;
setting an operation state of one MAC in the second MAC array to an enable state; and
setting an operation state of remaining MACs except for the one MAC in the second MAC array to a disable state.

16. The method of claim 10, wherein a weight used for the processing of the first input feature map has a height of "1", a width of "1", and a predetermined length.

17. The method of claim 16, wherein a value of the weight is "1".

18. The method of claim 10, wherein operation results of the MACs included in the first MAC array are concatenated in an adder tree operation.

19. A non-transitory computer-readable storage medium storing instructions that, when executed by a processor, configure the processor to perform the method of claim 10.

20. A neural network operation apparatus, comprising:
a first multiplier-accumulator (MAC) array configured to perform a depthwise convolution operation on a first input feature map;
a second MAC array configured to perform the depthwise convolution operation on a second input feature map; and
a controller configured to, in each of the first MAC array and the second MAC array, set an operation state of one MAC to an enable state and set an operation state of remaining MACs except for the one MAC to a disable state,
wherein, based on the set operational states, the first MAC array and the second MAC array are configured to perform an elementwise sum operation of the first input feature map and the second input feature map by respectively performing the depthwise convolution operation.

21. The apparatus of claim 20, wherein the depthwise convolution operation is performed based on weights, and a total number of the weights is equal to a total number of input channels of either of the first input feature map and the second input feature map.

22. The apparatus of claim 20, wherein
the first input feature map and the second input feature map correspond to images, and
the first MAC array and the second MAC array are configured to generate an output feature map by the performing of the elementwise sum operation.

* * * * *